July 11, 1950     S. NOODLEMAN     2,514,896
ELECTRIC MOTOR CONTROL

Filed Sept. 17, 1947     2 Sheets-Sheet 1

Patented July 11, 1950

2,514,896

UNITED STATES PATENT OFFICE 2,514,896

ELECTRIC MOTOR CONTROL

Samuel Noodleman, Dayton, Ohio, assignor to Standard Dayton Corporation, Dayton, Ohio, a corporation of Ohio Application September 17, 1947, Serial No. 774,600

10 Claims. (Cl. 318—210)

This invention relates to an electric motor control and more particularly to an improved arrangement for quickly stopping a motor.

There are many motor installations wherein a motor is used for intermittently driving a given piece of machinery which must be started and stopped at frequent intervals and in which the time required for stopping the motor and the machine driven thereby should be kept at a minimum. Thus in some factory operations the motor is required to operate for only a short period of time to complete a given operation and if too much time is required for allowing the machinery to come to a standstill after each operation, valuable time is lost and the labor cost for the operation becomes excessive. In many factory operations, machines are used which must be stopped almost instantaneously for reasons other than for time saving and unless some means is provided for overcoming the momentum of the moving parts of the machine, the machine will coast along for some time under its own momentum. Various arrangements have been devised for quickly stopping a motor at the completion of a given operation and these have operated with varying degrees of success. Some have been impractical in that they have not been able to stand up over a longer period of time, others have been impractical due to repeated mechanical failures, and still others have proven unsatisfactory due to the excessive wear on the equipment or for other reasons. It is an object of this invention to provide an inexpensive trouble-free motor control which is smooth and rapid in operation.

More particularly, it is an object of this invention to provide a motor control arrangement for a polyphase motor wherein a braking effect is produced by reconnecting the phase windings of the motor so as to reverse the torque during the initial braking period and to subsequently automatically disconnect the current as the motor approaches zero speed so as to prevent operating the motor in reverse.

A further object of this invention is to provide a motor control circuit arrangement which is efficient in operation.

Still another object of this invention is to provide a motor control arrangement which is compact.

Still another object of this invention is to provide a motor control system using conventional relays and switches of proven durability.

Further objects and advantages of the present invention reside in the construction and combination of parts and in the mode of operation as will be apparent from the following description, reference being had to the accompanying drawings wherein a preferred form of the present invention is clearly shown.

Figure 1:
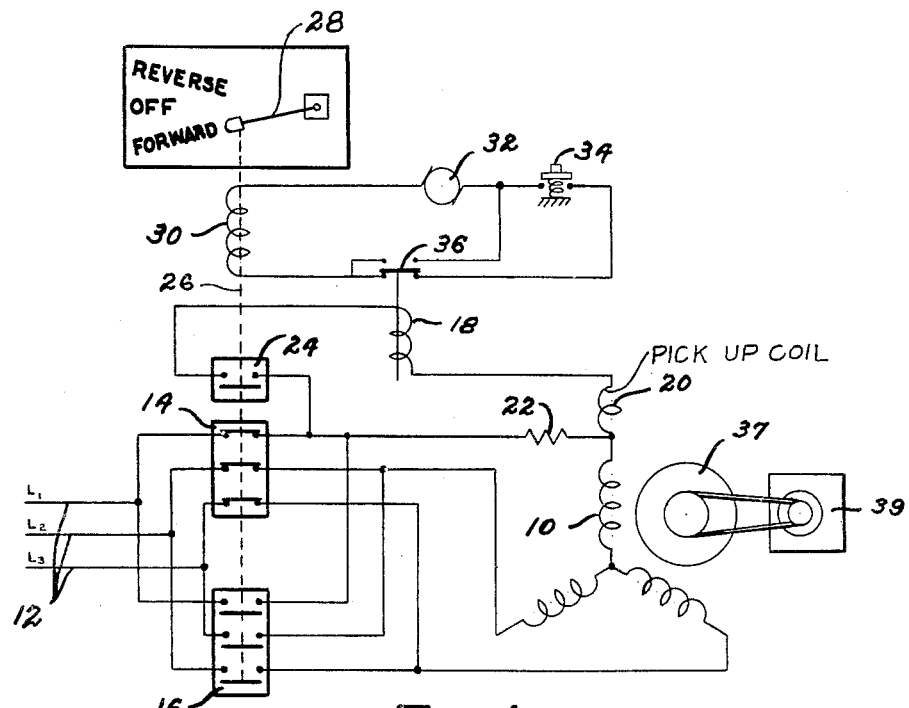
Figure 1 is a schematic circuit diagram showing one motor control circuit arrangement.

Referring now to Figure 1 of the drawing wherein I have schematically shown a motor control arrangement, reference numeral 10 designates the phase windings of a three-phase motor stator which is adapted to be connected to a suitable source of power represented by the three-phase power supply lines 12. Reference numeral 14 designates the main power switch which controls the flow of current to the motor during normal energization of the motor for operation in a first or forward direction. Reference numeral 16 designates a conventional three-pole switch which when closed is adapted to supply current to the motor windings so as to reverse the motor torque in a manner to be explained more fully hereinafter.

Reference numeral 18 designates a control relay coil which is connected in series circuit relationship to the pick up coil 20 incorporated in the motor so as to link a portion of the stator flux and reference numeral 22 designates a resistance which is connected in the circuit as shown. The flow of current through the coil 18 and the pick up coil 20 is controlled by the switch 24. The switch 24 is connected so as to be operated along with the control switches 14 and 16 by the common switch operator 26 which in turn may be controlled either by the manual operator 28 or the relay coil 30. The coil 30 is arranged to be supplied with current from any suitable source such as the generator 32 and is arranged in series with a switch 34 and the solenoid operated switch 36. The switch 34 may be manually controlled or it may be controlled automatically so as to stop the motor upon completion of a given operation.

For purposes of illustration, I have shown the manual operator 28 and the switches 14, 16 and 24 in the position which they would normally occupy during operation of the motor in the forward direction. The motor includes a conventional motor rotor 37 which may be belted or otherwise connected to the driven member or load 39 which is intended to represent any type of load such as a lathe, drill press, punch press or the like. When it is desired to quickly stop the motor and the machine 39 for any reason, such as to begin a new operation, the manual switch 34 is momentarily closed so as to energize the solenoid or relay coil 30. Energizing of the coil 30 tends to lift the switch operator 26 so as to open the main power switch 14 and so as to close the switches 16 and 24.

Closing switch 24 and closing switch 16 reverses the connections to the phase windings and thus reverses the torque applied to the rotor 37. Upon closing the switch 16 the voltage in the coil 18 begins to change as the motor speed changes in response to the reversal of the phase windings. In referring to Figure 1 of the drawing, it will be noted that the contactor of the switch 36 bridges the upper set of contacts when the solenoid 18 is deenergized. Consequently, pressing down on the manual switch button 34 completes the circuit to the coil 30 whereby the switch 24 is closed, with the result that the solenoid 18 pulls the contactor 36 down into engagement with the lower set of contacts, so as to maintain the circuit to the solenoid 30 closed even after one releases the pressure on the stop button 34. So long as the solenoid 18 is properly energized, the switch 36 will hold the solenoid 30 energized, but when the speed of the motor 37 approaches zero, the solenoid 18 is no longer capable of holding the contactor 36 in the down position, with the result that the contactor 36 returns to its upper position, so as to break the circuit to the relay 30 and thereby disconnect the main windings of the motor from the power line. Movement of the switch contactor 36 to the upper position, in which it is shown in Figure 1, does not serve to reenergize the solenoid 30, as the circuit will have been broken through the stop switch 34 before the contactor 36 moves upwardly into the position which it normally occupies when the solenoid 18 is deenergized. Opening of the circuit by switch 36 causes a deenergizing of the solenoid coil 30 which in turn causes the switches 16 and 24 to open. When the switches 16 and 24 are thus opened the manual switch operator 28 returns to the "off" position in which the switches 14, 16 and 24 are all open. In order to restart the motor, the manual operator 28 is moved from the "off" position to the "forward" position which allows the above cycle to be repeated. If it is desired to actually reverse the direction of rotation of the motor 10, the manual operator 28 may be moved into the "reverse" position and manually held in that position.

Figure 2:
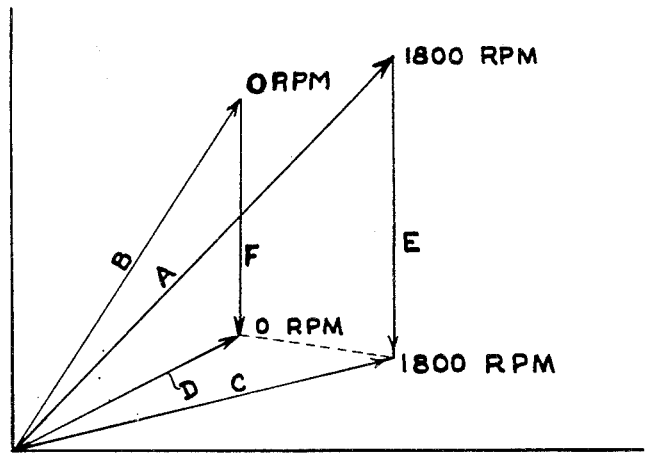
Figure 2 is a vector diagram illustrating the changes in phase relationship of the various voltage vectors; and, Figure 3 is a schematic wiring diagram showing a preferred motor control arrangement.

Referring now to Figure 2 of the drawing wherein I have shown a vector diagram, the vector A represents the voltage across the resistance 22 when the motor is operating near full speed but after the phase connection has been reversed. The vector B represents the voltage across the same resistance when the motor approaches zero speed. The vector C represents the voltage applied to the control relay coil 18 when the motor is operating near full speed and the vector D represents the voltage applied to the same coil 18 at zero speed. The vector E represents the induced voltage in the pick up coil 20 when the motor is operating near full speed whereas the vector F represents the induced voltage in the pick up coil 20 when the motor speed approaches zero. The difference in length of the vectors representing the voltage applied to the coil 18 represents the change in voltage which is utilized for controlling the operation of the switch 36. The switch 36 is designed to open when the applied voltage of the coil 18 approaches that represented by the vector D.

In referring to Figure 2, it will be noted that the vectors A and B are almost equal in length and that the vectors E and F are likewise almost equal in length whereas the vector C is considerably longer than the vector D. Thus the voltage across the resistance 22 does not change much in magnitude between full speed and zero speed but it does change in phase relationship. Likewise, the magnitude of the induced voltage in the pick up coil 20 does not change much in magnitude. Only the magnitude of the vectors representing the voltage applied to coil 18 changes to any great extent and it is this change which is relied upon to deenergize the main motor windings. The shift in phase of the current flowing through the circuit, which includes the coil 20 and the resistance 22, is due to the change in the power factor in the motor resulting from the reversal of the phase windings and resulting from the change in speed of the motor armature.

The vector diagram shown in Figure 2 is merely intended to represent generally the relationship of the vectors and is not intended to represent exact values as the values may be varied somewhat without departing from the spirit of my invention.

Figure 3:
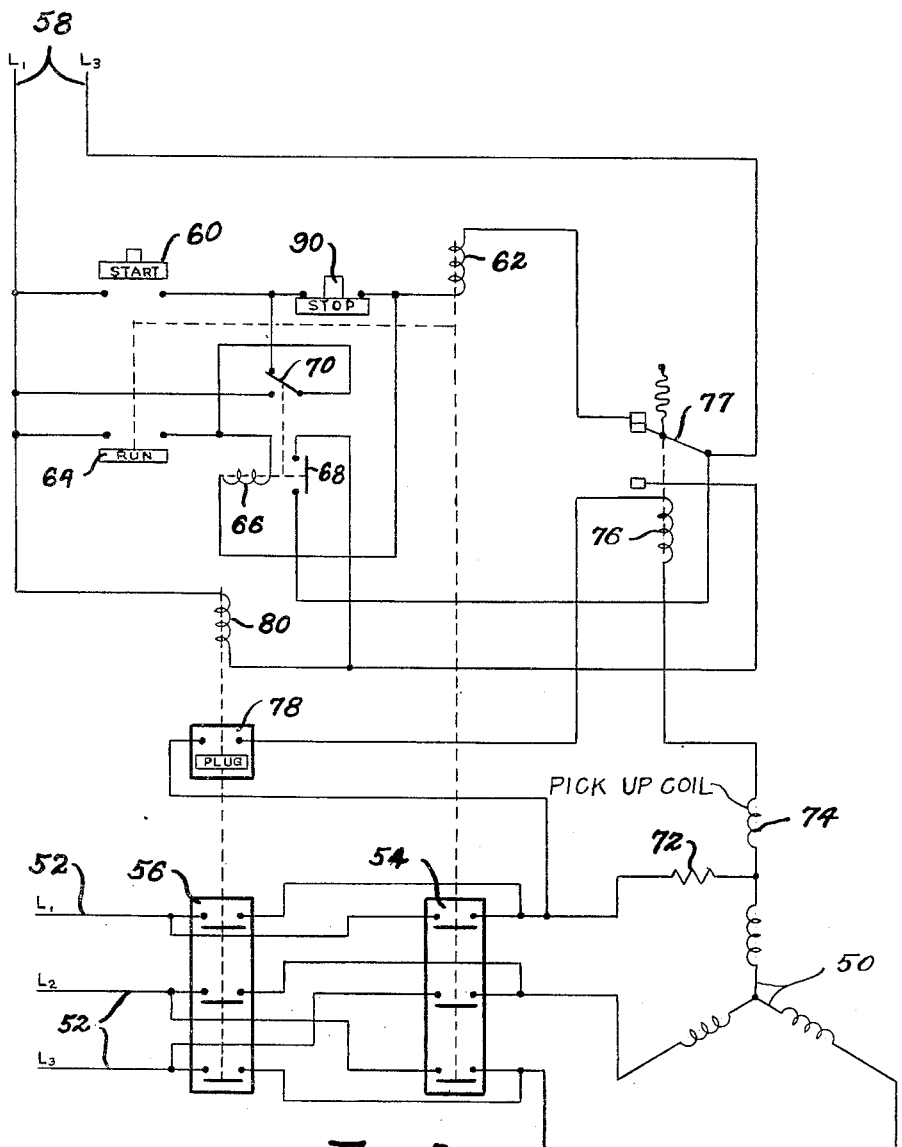

Referring now to Figure 3 of the drawing wherein I have shown a circuit arrangement of the type which has proven to be very satisfactory in operation, reference numeral 50 designates the conventional three-phase field windings of a motor which is adapted to be supplied with power from the three-phase power lines 52 through the motor control switch 54 which when closed supplies power to the motor winding 50 in the proper phase relationship for causing the motor to operate in the forward direction. Reference numeral 56 designates the reversing switch which is used for momentarily supplying power to the motor 50 when it is desired to reverse the direction of rotation of the revolving field of the motor so as to stop the motor in accordance with my invention. Reference numeral 58 is used to designate a power supply for the auxiliary control circuit. The power supply 58 may be obtained from the main power lines 52 or it may be obtained from any other suitable source such as a generator or a battery. In order to start the motor in the forward direction, the main starting switch 60 is closed so as to energize the control relay coil 62 which closes the main power switch 54 and the control switch 64 (referred to as the "run" switch). Closing of the switch 64 connects the coil 62 in circuit independently of the starting switch 60. Reference numeral 66 designates a transfer relay which when energized closes the switch 68 and moves the single pole double throw switch 70 from its upper position in which it is shown in Figure 3 to its lower position. The relay 66 has a high impedance in comparison with the impedance of the relay coil 62 so as to operate when connected in series with the coil 62. The relay 66 is normally shorted out by the switch 90. A resistance element 72 is provided in the pick up coil circuit as shown and is arranged in series with the pick up coil 74 and the control relay 76. The circuit including the pick up coil 74 and the control relay 76 is controlled by the switch 78 which in turn is controlled by the contactor relay 80. The relay 80 not only controls the switch 78 but also controls the polarity changing switch 56. In order to stop the motor, I have provided a stop switch 90 which is normally biased to the closed position and which when opened removes the short across the relay 66 so as to cause the relay 66 to close the switch 68 and actuate the switch 70 to its lower position. When this takes place, the transfer relay 66 is energized and relay 62 opens switches 54 and 64. Closing of switch 68 energizes relay or solenoid 80 so as to close the polarity changing switch 56 and the switch 78. Closing the switch 78 places the pick up coil 74 in circuit with the resistance 72 and the control relay coil 76. When the control relay 76 is energized, it actuates the switch 77 so as to move it from the position in which it is shown to its lower position. This deenergizes the transfer relay 66 so as to open switch 68. The relays 76 and 66 are so constructed that the control relay 76 acts faster than either the transfer relay 66 or the relay 80 so that when the voltage applied to the control relay 76 indicates that the motor speed is approaching zero the switch 77 will move into its upper position so as to deenergize coil 80 and open the switches 56 and 78 so as to disconnect the motor completely before the directions of rotation actually reverses.

Upon deenergization of the control relay coil 76 and stopping of the main motor, the control relays and switches are ready for a repetition of the above described cycle of operation. Thus the motor may be started by pressing the starting switch 60 and the motor will continue to run until one presses the "stop" switch 90 which puts into operation the controls which automatically reverse the phase winding of the motor field and deenergize the entire motor field as the motor approaches zero speed.

For purposes of illustrating my invention, I have shown a three-phase motor in each illustration whereas the invention is applicable to motors having more or less than three phases. The pick up coil arrangement shown may be in the nature of a tapped winding or it may be a separate coil built into the motor for generating a voltage which would buck the voltage across the resistance in the one phase winding. The pick up coil arrangement is also adaptable for other uses such as energizing a relay for controlling the operation of signal lights, etc.

In lieu of using a pick up coil or tapped winding for generating a bucking voltage to oppose the voltage drop across the resistance 22 or 72 one could use any other suitable means for supplying a bucking voltage such as a transformer arrangement in which one winding of the transformer would be connected in the circuit so as to take the place of the pick up coil.

While the form of embodiment of the invention as herein disclosed, constitutes a preferred form, it is to be understood that other forms might be adopted, all coming within the scope of the claims which follow.

This application is related to my copending application Serial No. 624,174 filed October 24, 1945, now Patent Number 2,442,207, and Serial No. 698,368 filed September 20, 1946, now Patent Number 2,442,208.

Having thus described my invention, I claim:

1. In combination, a polyphase motor having a squirrel cage rotor and a stator, a source of polyphase current, first switch means for supplying current to said motor stator from said source in a phase relationship so as to create a torque on said rotor so as to operate the motor in the forward direction, second switch means for supplying current to said motor from said source in a phase relationship so as to create a torque on said rotor in the reverse direction, first coil means responsive to induced voltage within said motor, second coil means connected in circuit with said first coil means, solenoid means for controlling the operation of said first and second switch means, and switch means operated by said second coil means for controlling the energization of said solenoid means.

2. In combination with a polyphase squirrel cage motor having coil means responsive to induced voltage within said motor, first switch means adapted to connect said motor to a polyphase source of current so as to energize said motor for rotation in one direction, second switch means adapted to connect said motor to said source of polyphase current for energizing the motor for rotation in the opposite direction, and motor stopping means including first means for opening said first switch and for closing said second switch and second means responsive to a change in said induced voltage in said motor for automatically deenergizing said motor in response to a predetermined reduction in speed of said motor.

3. In combination, a polyphase motor, a resistance in one phase of said motor, means for bucking the voltage across said resistance, a source of polyphase current, first switch means for connecting said motor to said source of current for operation of the motor in a given direction, second switch means for reversing the phase relationship within said motor so as to reverse the torque of said motor, and relay means operated in response to a change in the vector sums of the voltage across said resistance and the bucking voltage for disconnecting said motor from said source of current.

4. In combination; a polyphase motor; a source of current; first switching means for connecting said motor to said source of current; second switching means for reversing the phase relationship within said polyphase motor so as to change the direction of torque of said motor; a pick up coil within said motor linking a portion of the motor flux; a resistance in one phase of said motor, a control relay means arranged in series with said pick up coil; third switching means for controlling the flow of current from said pick up coil to said control relay means; and a control circuit including a solenoid coil for operating said second and third switching means; said control circuit including a switch operated by said control relay, a low impedance contactor relay for operating said first switching means, a starting switch and a stop switch in series with said contactor relay, a running switch in parallel circuit relationship with said starting switch and operated by said contactor relay, said low impedance contactor relay being arranged to close said running switch and said first switching means when energized, a high impedance transfer relay adapted to be connected in series with said low impedance contactor relay upon opening of said stop switch, and means whereby a change in the vector of the induced voltage within said pick up coil and the voltage drop across said resistor deenergizes said solenoid coil.

5. In an electromagnetic control device for use with a motor having a plurality of phase windings, the combination including a resistance element adapted to be connected in series with one of said phase windings, a pick up coil adapted to link a portion of the motor flux for generating a voltage, and control means including a solenoid energized by the voltage that is the resultant of the voltage across said resistance element and said generated voltage.

6. In a voltage controlled switching device for use in the stator winding circuit of a polyphase motor having a stator and a rotor, the combination, means for causing a voltage drop in phase with the current flowing through one of the stator windings, a pick up coil arranged in the path of a portion of the stator flux for generating a voltage, and switching means energized by a voltage that is the resultant of the voltage drop in phase with the current flowing through one of the said windings and the voltage generated by the pick up coil, said switching device being actuated in response to a pre-determined change in conditions within the motor.

7. In a braking mechanism for a polyphase motor provided with a plurality of phase windings, the combination, mechanism for reversing the polarity of at least two of said phase windings so as to reverse the motor torque for braking purposes and voltage responsive relay means for deenergizing said phase windings, said relay means including a control relay coil, a resistance in series with one of said phase windings, a pick up coil linking the flux of a portion of the motor, and means for impressing the resultant vector of the voltage drop across the resistance and the voltage generated in the pick up coil upon the control relay coil to open circuit the field windings in response to a pre-determined decrease in speed of said motor.

8. A brake mechanism for a polyphase motor provided with a plurality of field windings comprising first means for reversing the polarity of at least two of said windings at full motor speed and second means for deenergizing said field windings upon a pre-determined reduction in speed of said motor, said second means including means for causing a voltage drop in phase with the current flowing through at least one of the field windings, a pick up coil linking a portion of the motor field for generating a voltage that is influenced by the phase displacement of the currents flowing through the windings of the motor and the speed of the motor rotor, and coil means energized by a voltage that is the resultant of the voltage drop in phase with the current flowing through said one field winding and the voltage generated by the pick up coil for deenergizing said field windings.

9. In a polyphase motor system, means for connecting a supply of polyphase current to the phase windings of said motor in a phase relationship for operating the motor at full speed in the forward direction, means for reversing the phase relationship of the phase windings of the motor so as to reverse the motor torque, means for generating a voltage influenced by the phase displacement of the current flowing through the motor windings and the motor speed, and means for disconnecting the motor when the vector sum of said generated voltage and the voltage drop across a given resistance in one phase of said windings equals a pre-determined value indicative of a given reduction in motor speed.

10. In combination, a polyphase motor having a squirrel cage rotor and a stator, a source of polyphase current, first switch means for supplying current to said motor stator from said source in a phase relationship so as to create a torque on said rotor so as to operate the motor in the forward direction, second switch means for supplying current to said motor from said source in a phase relationship so as to create a torque on said rotor in the reverse direction, first coil means responsive to induced voltage within said motor stator, second coil means connected in circuit with said first coil means, solenoid means for controlling the operation of said first and second switch means, and switch means operated by said second coil means for controlling the energization of said solenoid means.

SAMUEL NOODLEMAN.

REFERENCES CITED

The following references are of record in the file of this patent:

UNITED STATES PATENTS

| Number | Name | Date |
| --- | --- | --- |
| 1,315,965 | Jennings | Sept. 16, 1919 |
| 1,504,224 | Fisher | Aug. 12, 1924 |
| 1,515,232 | Whittingham | Nov. 11, 1924 |
| 1,975,829 | Crout | Oct. 9, 1934 |